F. LAMPLOUGH.
MEANS FOR CONVERTING RECIPROCATING INTO ROTARY MOTION.
APPLICATION FILED MAR. 28, 1910.
1,012,208.
Patented Dec. 19, 1911.
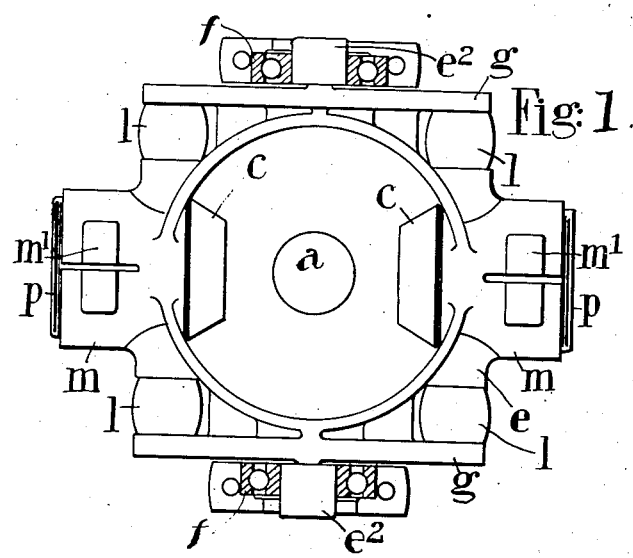
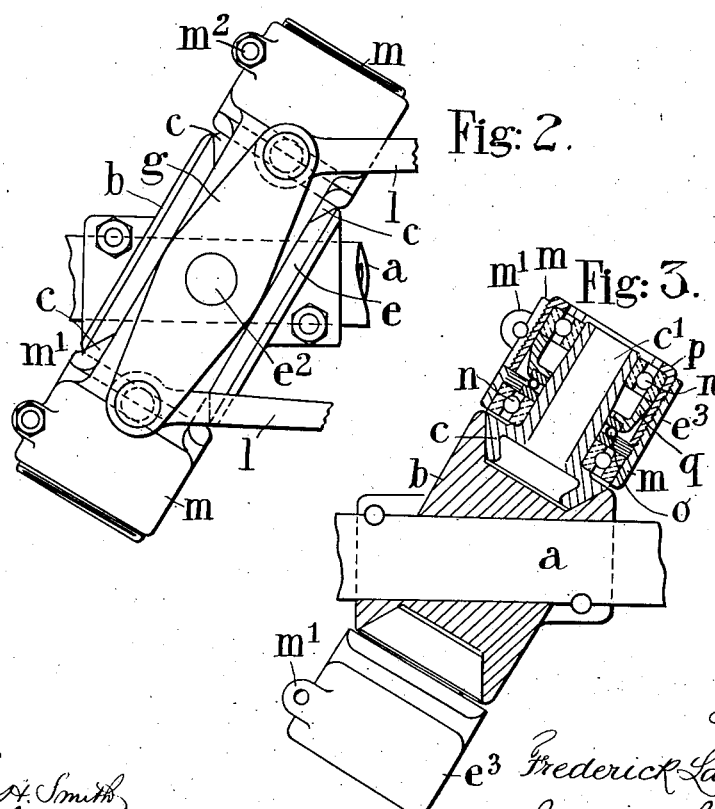
Witnesses
Chas H. Smith
Inventor
Frederick Lamplough
by Harold Serrell
his Atty

UNITED STATES PATENT OFFICE.

FREDERICK LAMPLOUGH, OF LONDON, ENGLAND.

MEANS FOR CONVERTING RECIPROCATING INTO ROTARY MOTION.

1,012,208.  Specification of Letters Patent.  Patented Dec. 19, 1911.

Application filed March 28, 1910. Serial No. 552,050.

*To all whom it may concern:*

Be it known that I, FREDERICK LAMPLOUGH, a subject of the King of Great Britain, residing at London, England, have invented new and useful Means for Converting Reciprocating into Rotary Motion, of which the following is a specification.

The invention relates to means for obtaining rotary motion of a shaft, and consists in the combination and arrangement of parts herein shown and described.

I will describe my invention by means of the accompanying drawings, in which—

Figure 1 is a face view, Fig. 2 is a plan, and Fig. 3 is a horizontal section.

$a$ is the shaft to which rotary motion is to be given.

$b$ is an angularly set disk fixed on the shaft $a$.

$e$ is a yoke which is oscillated by a prime mover about an axis at right angles to and passing through the axis of the shaft $a$. The power transmitted to the oscillating yoke $e$ is applied to the angularly set disk $b$ at points equidistant from and on a line which passes through the axis of the shaft $a$ and is at right angles to the axis of oscillation referred to above. A pair of diametrically opposite conical rollers $c$ are located with their centers of rotation on the line aforesaid and have their axles $c'$ mounted in bearings $e^3$ carried by the yoke $e$. These conical rollers $c$ fit within a tapered annular groove or race around the periphery of the angularly set disk $b$.

The yoke $e$ has trunnions $e^2$ mounted in fixed bearings $f$ and it is formed or provided with two levers $g$ arranged on opposite sides of the shaft $a$ and connected by links or connecting rods $l$ to a prime mover, not shown. By these means a reciprocating motion is given to the yoke $e$, and this latter, by its conical rollers $c$ located within the tapered peripheral groove of the angularly set disk $b$, and alternately pulling and pushing against said disk, gives rotary motion thereto and consequently to the shaft $a$.

Each of the bearings $e^3$ for the axles $c'$ of the conical rollers $c$ may, for constructional purposes, be conveniently fitted within a split socket $m$, and as shown, is provided with two rows of anti-friction balls $n$, and a ball-thrust bearing $o$ is arranged between the two rows of balls of each bearing.

Means for taking up the wear on the conical rollers $c$ may be provided as follows:—A screwed sleeve $p$ carrying the outer ball race is screwed into the split socket $m$ and a distance piece $q$ is placed between said outer ball race and the thrust bearing $o$ to force the latter with its conical roller $c$ forward. In order to prevent the screwed sleeve $p$ unscrewing in the split socket $m$, this latter, on each side of the split, is provided with a lug $m'$ and a screw or bolt $m^2$ is used to tighten the split socket $m$ around the sleeve $p$.

I claim as my invention:

In means for converting reciprocating into rotary motion, the combination of a yoke, trunnions by which said yoke is carried, levers carried by said trunnions, means for reciprocating said levers, a shaft, a disk fixed at an inclination on said shaft, said disk having a groove in the periphery thereof, two split sockets carried by said yoke, means for tightening said sockets, a sleeve screwing in each of said sockets, a ball-bearing carried by said sleeve, a distance piece adjacent to said ball bearing, a thrust bearing in contact with the distance piece, a second ball bearing, a trunnion carried by said ball bearings and thrust bearing, and a conical roller carried by said trunnion and acting in said groove, substantially as shown and described.

In witness whereof I have hereunto set my hand in presence of two witnesses.

FREDERICK LAMPLOUGH.

Witnesses:
  CLAUDE K. MILLS,
  WM. GIRLING.